United States Patent Office 2,996,538
Patented Aug. 15, 1961

2,996,538
PREPARATION OF MONOMERIC POLYGLYCOL ACRYLATE AND METHACRYLATE ESTERS
Christiaan P. van Dijk and Stanley A. Murdock, Concord, Calif., assignors to The Dow Chemical Company, Midland, Mich., a corporation of Michigan
No Drawing. Filed Nov. 25, 1957, Ser. No. 698,388
11 Claims. (Cl. 260—486)

The present invention contributes to the chemical arts and is more particularly pertinent to a new and improved method or process for the preparation of various monomeric polyglycol acrylate esters of the formula:

$$X(C_2H_4O)_y(C_3H_6O)_z(OC-ZC=CH_2) \quad (I)$$

wherein X is selected from the group consisting of —OR radicals in which R is an aliphatic hydrocarbon group containing from 1 to about 8 carbon atoms, —SR radicals in which R is an aliphatic hydrocarbon group containing from 1 to about 8 carbon atoms, acrylate radicals $$(CH_2=CH-COO-),$$

methacrylate radicals ($CH_2=CCH_3-COO-$), and halogens of atomic number 17 to 53 (i.e., chlorine, bromine and iodine); Z is selected from the group consisting of hydrogen and methyl; y is a number having an average value of from about 5 to 200; and z is a number that has an average value from 0 to about 10.

Polyglycol esters of high molecular weight can be prepared quite readily by esterification of the polyglycol constituent. Monomeric polyglycol esters can also be made readily in this manner, in which case it is ordinarily desirable to include a polymerization inhibitor in the monomer-producing reaction mass so as to preclude the occurrence of undesirable polymerization of the product in the reaction mass in which it is prepared. High molecular weight polyglycol esters, however, are quite difficult to isolate from the reaction mass in which they are prepared, particularly when they are monomeric compounds. This is because of the difficulty with which such monomeric polyglycol ester products are isolated from unreacted polyglycol constituents and any polymerization inhibitors that may be present in the reaction mass. Among other factors, the high and similar molecular weights of the desired products with unreacted materials make distillation a difficult and impractical technique for product recovery. Similarly, the high and commensurate water solubilities of the product with unreacted polyglycol constituents or polymerization inhibitors renders crystallization a relatively poor technique for the desired purpose. As a consequence, the preparation of monomeric polyglycol esters by esterification techniques has been hampered by the lack of a suitable method for the recovery of the monomer products.

It would be an advantage to provide a new and improved method for the preparation of monomeric polyglycol esters of high molecular weight wherein the product could, in a ready and efficient manner, be easily recovered from the reaction mass.

The achievement of this desideration and the provision of such an improved method or process is the chief aim and concern of the present invention.

The present invention, as hereinafter more fully delineated, consists of a particular combination of steps which fulfill the requirements for satisfactory preparation of monomeric polyglycol esters of the above described variety. The essential step, and the most critical feature of the present invention, lies in the recovery of the monomer product from the reaction mass by separation of the product in a liquid-liquid extraction of the monomer product with a solvent which is immiscible in water and which, among other characteristics, has a "solubility parameter" (a characteristic which hereinafter is more fully delineated) that, in general, is between about 9 and 10.5.

Without being limited to or by the specific embodiment and modes of operation set forth, the invention is illustrated in and with the following didactic examples wherein, unless otherwise indicated, all parts and percentages are to be taken on a weight basis.

EXAMPLE 1

A 12 liter, 3-necked, round bottom flask was equipped with a mechanical agitator, a nitrogen bubbler tube (or sparger) and a fractionating column. The fractionating column had an internal diameter of about 65 mm. and a height of about 36 inches. It was packed with 8 by 8 mm. glass Raschig rings. The column was also equipped with a condenser and an automatic take-off head which was capable of being adjusted to any desired reflux ratio. The 12 liter flask was heated by means of an electrical mantle.

Into the flask there was charged about 5,000 grams of a polyethylene glycol monomethyl ether having an average molecular weight of about 600; about 3000 grams of methyl methacrylate; about 250 grams of para-toluene sulfonic acid; and about 250 grams of copper sulfate pentahydrate ($CuSO_4 \cdot 5H_2O$). The toluene sulfonic acid was employed as a transesterification catalyst and the copper sulfate as a polymerization inhibitor. Nitrogen bubbling was commenced through the charged ingredients in the reactor. At the same time, agitation was started and heat was applied to the reaction mass. Within 20 minutes, vapors were observed at the top of the fractionating column. The column was run on total reflux for about 2 hours to permit the overhead temperature to drop to about 66° C. which, when arrived at, indicated that a mixture of about 35 percent vaporized methyl methacrylate and 65 percent vaporized methanol was passing out of the column. At this point the temperature of the reaction mass was about 110° C. The automatic take-off head was then set for about a 10 percent removal of condensate. At this reflux ratio, the overhead temperature in the fractionating column remained substantially constant. After about 3 hours of additional operation, the overhead temperature in the fractionating column began to steadily increase. When the overhead temperature reached about 80° C., the heating of the reaction mass was discontinued. At this point its temperature was about 121° C. The reaction mass was then permitted to cool for about an hour, after which the toluene sulfonic acid was neutralized with about 200 grams of sodium acetate. Two liters of water were then added to the reactor and the contents thereof subjected to steam distillation until no drops (or separate phase) or other sign of methyl methacrylate could be observed in the distillate.

The residue in the reactor after the steam distillation was found to be comprised of a clear, green-colored solution that contained some particles of polymer in the form of small round beads. The polymer particles were filtered from the reaction mass to yield about 6610 grams of a clear, green, aqueous solution containing the methoxy polyglycol methacrylate, the unreacted monomethyl ether of the polyglycol, copper sulfate, and the neutralized toluene sulfonic acid. The filtrate, upon analysis by bromination, was found to contain about 0.945 mole per kilogram of ethylenically unsaturated double bonds (C=C). This corresponded to about a 75 percent yield of the desired monomeric methoxy polyglycol methacrylate.

About 5000 grams of the filtrate was extracted in a separatory funnel with about 4000 grams of dichloroethane by mixing the filtrate and the solvent together in a vigorous fashion. The separatory funnel was placed in a cold room for about 16 hours wherein it was maintained at a temperature of about −18° C. Upon removal from the cold room, it was found that two sharp layers had formed. The upper aqueous layer was light green in color. The lower oleaginous layer was clear and light brown in color. When the layers were separated and analyzed for C=C by bromination, the oil layer, consisting of about 6925 grams, was found to contain about 0.63 mole of C=C per kilogram. The water layer, consisting of about 2190 grams, was found to contain about 0.15 mole of C=C per kilogram. The weight increase of the oil layer was about 2925 grams. By material balance, about 93 percent of the unsaturated material was recovered in the single extraction with the dichloroethane solvent.

About 400 grams of a solution of the monomer in dichloroethane was prepared which, by bromine analysis, was found to contain about 0.48 mole C=C per kilogram of solution. The monomer solution was inhibited against polymerization by addition thereto of about 1 gram of hydroquinone. The inhibited solution was evaporated under vacuum (20 mm. Hg absolute) at a temperature of from 35 to 40° C. until all of the dichloroethane solvent had been essentially removed. The resulting monomer product weighed about 111 grams and was found to contain about 1.75 moles C=C per kilogram. This indicated that essentially no polymerization had occurred in the monomer recovery. The resulting monomer product was a slightly viscous, light brown liquid at room temperature. Its viscosity at 25° C. was about 52 centipoises and its density at the same temperature was about 1.104 grams per cubic centimeter. Its saponification equivalent weight was found to be about 703. The monomer, upon heating, was found to either decompose or polymerize before boiling. The monomer was soluble in water, methanol, ethanol, isopropanol, perchloroethylene, dichloroethylene, carbon tetrachloride, methyl ethyl ketone, methyl isobutyl ketone and acetone.

The monomer was capable of being converted to various polymeric products having excellent utility in connection with acrylonitrile polymer compositions for purposes of increasing their dye-receptivity, decreasing their static characteristics, and enhancing their stability to light, heat and alkaline media.

EXAMPLE 2

Into a 15 gallon, glass-lined, jacketed kettle equipped with an anchor-type agitator, a 10 plate, 3-inch diameter sieve-plate distillation column (having an automatic proportional take-off head and a nitrogen sparge tube), there was charged the following:

| | Pounds |
|---|---|
| Monomethyl ether of a polyethylene glycol having an average molecular weight of about 600 | 20.0 |
| Methyl methacrylate | 10.0 |
| Benzene | 17.5 |
| Copper sulfate pentahydrate | 1.0 |
| Para-toluene sulfonic acid monohydrate | 1.0 |

The charged mass in the reactor was brought to the boil and the distillation column operated on a total reflux setting until the overhead temperature in the column reached about 60.5° C. This required about a one hour heating period. After this period, the automatic take-off head on the column was set to remove about 3 percent of the total condensate. With continued heating, the overhead temperature in the distillation column reached an equilibrium at about 62° C. At this equilibrium, the temperature of the reaction mass was about 88° C. About 20 hours after the start-up, the pot or reactor temperature had risen to about 95° C. and the temperature of the distillation column overhead to about 62.5° C. About 46 hours after the start-up, the pot temperature had risen to 98° C. and the overhead to 70° C. At this point, heating of the reactor was discontinued, whereupon the benzene and methyl methacrylate remaining in the reaction mass were removed by steam distillation (after first neutralizing the acid catalyst in the reaction mass with about 1.0 pound of sodium acetate). The reaction mass was then removed from the kettle and a small quantity of insoluble polymer beads that had formed during the reaction was filtered therefrom. About 72.2 pounds (32.8 kilograms) of a clear, green colored, aqueous solution of filtered reaction mass was thereby obtained. The filtrate contained the desired monomer product with unreacted polyglycol monomethyl ether, copper sulfate, neutralized para-toluene sulfonic acid and sodium acetate. Upon bromine analysis for C=C, about 72 percent of the polyglycol starting material was found to have been converted to a monoester acrylate monomer. The aqueous solution was then extracted with ethylene dichloride (1,2-dichloroethane) in a single stage extraction using a separatory funnel with the following results:

| In | Out |
|---|---|
| 1,000 grams filtered reaction mass. | 1,150 grams oil layer. |
| 1,000 grams water. | 1,850 grams water layer. |
| 1,000 grams ethylene dichloride. | |

About 180 grams of monomer was present in the 1000 gram sample of filtered reaction mass that was extracted. Thus, about 132 grams (or 73.3 percent) of the monomer present in the filtered reaction mass was recovered in the ethylene dichloride layer in a single stage solvent extraction.

EXAMPLE 3

Following the procedure of the first example, about 4000 grams of the same polyglycol monomethyl ether, about 350 grams of para-toluene sulfonic acid and about 385 grams of anhydrous copper sulfate were charged to the reactor. The charged reaction mass was then heated to a temperature of about 105° C., at which point about 6000 grams of methyl methacrylate was added to the reactor. This addition of the monomer cooled the contents of the reactor to about 57° C. Within 30 minutes after addition of the methyl methacrylate, the condensers were returning reflux to the fractionating column. At this point, the pot temperature was 104° C. and the overhead temperature in the fractionating column was about 80° C. Within one hour after start-up (considered as the point at which the methyl methacrylate charged to the reaction mass was completed) the automatic take-off head on the column was set for about 10 percent removal of the total reflux. The overhead temperature in the column was then about 69° C. Operation under these conditions was continued until about 12½ hours from start-up had expired. During this interval, samples of the distillation column overhead were taken and the methanol content of these samples determined by refractive index. From the weight of distillate taken and its methanol content, the percent conversion of polyglycol monomethyl ether to the desired monomeric methoxy polyglycol methacrylate product during the course of the reaction was determined. The results were as follows:

| Time in hours: | Conversion in percent |
|---|---|
| 0 | 0 |
| 2 | 48.7 |
| 4 | 71.3 |
| 6 | 85.5 |
| 8 | 93.5 |
| 10 | 96.7 |
| 11.5 | 97.5 |

After 11.5 hours of operation, the reactor was shut down.

Its contents were cooled to about 30° C. and the acid catalyst in the reaction mass neutralized with about 300 grams of sodium acetate. After the neutralization, the excess methyl methacrylate was removed from the reaction mass by steam distillation. The resulting aqueous product was filtered to remove polymer solids resulting in a clear, green colored filtrate. The monomer was then recovered by extraction with dichloroethane. Equal weights of dichloroethane and aqueous monomer solution were used. About 80 percent of the monomer was recovered in the dichloroethane solution in one equilibrium extraction. The aqueous solution contained about 60 percent by weight monomer. The monomer dichloroethane solution was light brown in color and clear and contained about 32.4 percent by weight of monomer.

EXAMPLE 4

The following, in appropriate quantities for reaction, was charged into a 3-necked, 12 liter flask that was equipped with a fractionating column, nitrogen sparging unit, and mechanical agitator:

| | |
|---|---|
| Polyethylene glycol monomethyl ether having an average molecular weight of 600 | Sufficient for reaction with methacrylate monomer. |
| Methyl methacrylate | 1568 grams. |
| Para-toluene sulfonic acid | 160 grams. |
| Hydroquinone | 80 grams. |

The flask was heated by an oil bath at 125–130° C. Overhead was removed at 65–69° C. over an 8.5 hour period. The reaction mass was then cooled, neutralized with about 122 grams of sodium acetate, and the methyl methacrylate vacuum distilled therefrom. After removal of the methyl methacrylate, about 2 liters of water was added to the reaction mass. After steam stripping, a slightly cloudy brown suspension was obtained as a product which became clear upon filtration. About 80 percent conversion of the polyglycol to monomer was obtained. The aqueous solution was extracted with an equal weight of dichloroethane. The aqueous solution contained about 50 percent by weight of monomer. About 70 percent of the monomer was recovered by the single stage extraction. The monomer-dichloroethane solution was light brown and clear and contained about 26 percent by weight of monomer.

The dichloroethane layer was washed 3 times with aqueous 5 percent caustic (NaOH) to remove the hydroquinone inhibitor. An essentially inhibitor-free solution of the desired monomeric polyglycol monoether and dichloroethane was thereby obtained. The monomeric product could be polymerized readily to various polymer products following any of the techniques described in the copending application for United States Letters Patent of Ardy Armen and Stanley A. Murdock entitled "Various Polymers of Certain Monomeric Acrylate and Methacrylate Monoesters of Polyglycols and Improved Acrylonitrile Polymer Compositions Obtainable Therewith" having Serial No. 698,767 which was filed on November 25, 1957.

EXAMPLE 5

Into a five liter flask equipped as in the first example, the following was charged:

| | Grams |
|---|---|
| Polyethylene glycol monomethyl ether having an average molecular weight of about 600 | 808 |
| Benzene | 800 |
| Methyl methacrylate | 392 |
| Para-toluene sulfonic acid | 40 |
| Hydroquinone | 0.8 |

Heating was commenced. The overhead distillation product was removed at 60–62° C. After 12 hours of operation, about 0.8 gram of additional hydroquinone was added. After 20 hours, the reaction was terminated. This was accomplished by adding about 32 grams of sodium acetate to the reaction mass. About 40 percent conversion of polyglycol to monomer was obtained as measured by C=C analysis. The benzene and methyl methacrylate were then removed by steam distillation. The remaining aqueous solution was then extracted with about equal weight of dichloroethane following the procedure of the fourth example. About 315 grams (90 percent) of the monomer product was thereby recovered in the single stage extraction. The resulting monomer-containing oil layer was washed with caustic as in Example 4 to produce inhibitor-free monomer solution.

EXAMPLE 6

About 250 grams of a polyethylene glycol monomethyl ether having a molecular weight of about 350; 250 grams of methyl methacrylate; 12.5 grams of para-toluene sulfonic acid; and 12.5 grams of copper sulfate pentahydrate ($CuSO_4 \cdot 5H_2O$) were charged into a one liter, 3-necked flask that was equipped with an efficient mechanical agitator, a nitrogen sparge tube and a packed fractionating column equipped with an automatic reflux proportioning take-off head. Heating was commenced under a nitrogen blanket with continued agitation. Overhead was removed initially when an overhead temperature in the column of about 70° C. had been obtained. Over a six hour period the overhead temperature gradually increased to about 80° C. At the end of this time, the reaction mass was neutralized with about 10 grams of sodium acetate. The remaining methyl methacrylate was then removed by steam distillation. About 70 percent conversion of the polyglycol to monomer product was obtained, as found upon bromine analysis for C=C of the reaction mass after termination of the reaction. The resulting aqueous solution was then extracted with dichloroethane in a single step using about equal weights of the solvent. About 59 percent of the originally present monomeric polyglycol monoester product was thereby obtained as a dichloroethane solution analyzing 0.107 mole C=C per kilogram.

EXAMPLE 7

The procedure of Example 6 was repeated, excepting to employ a polyethylene glycol monomethyl ether having an average molecular weight of about 900 as the starting material. About 75 percent conversion of the starting polyglycol to monomer product was achieved in 7½ hours. After being rid of unreacted methyl methacrylate and filtered, the aqueous monomer-containing product, weighing about 550 grams, was extracted in a single stage with about an equal weight of dichloroethane. About 140 grams (i.e., 70 percent recovery) of monomeric methoxy polyethylene glycol methacrylate, having a molecular weight of about 968, was obtained in the oil layer.

EXAMPLE 8

The procedure of Example 7 was duplicated with the exception that a polyethylene glycol monooctyl ether having a molecular weight of about 600 was used as a starting material. In about 7 hours, 75 percent of the polyglycol starting material was converted to the desired monomeric product. The steam distilled and filtered aqueous reaction mass, weighing about 600 grams, was then extracted in a single stage with about an equal weight of dichloroethane as in the seventh example. About 375 grams (or about 75 percent of the original monomer) of octoxy polyethylene glycol methacrylate having a molecular weight of about 668 was thereby recovered. The product could be homopolymerized, copolymerized with various other ethylenically unsaturated monomers or graft copolymerized on various polymer substrates including vinyl lactam polymer substrates.

EXAMPLE 9

When the procedure of any of the foregoing examples is duplicated, excepting to utilize as an extracting solvent either 1,1-dichloroethane or amyl alcohol, benzene or chlorobenzene, analogous results are obtained. In contrast, the extraction cannot be satisfactorily performed if the solvent employed is a water-miscible material, such as tertiary butyl alcohol or acetone, or an aliphatic hydrocarbon, an aromatic hydrocarbon containing more than 6 carbon atoms in its molecular structure, carbon tetrachloride, ethyl or butyl acetates, or diethyl ether.

Analogous excellent results may be achieved when the foregoing procedures are repeated excepting to practice multiple stage extractions or to perform the extractions in the manner of continuous extraction processes.

Similar excellent results may also be obtained to recover any monomeric products from the reaction mass which conform to the Formula I, set forth in the foregoing, when they are prepared in general accordance with the above-described esterification procedures.

As has been demonstrated in the foregoing, the present invention concerns a new and improved method which essentially involves an advantageous and efficient recovery step and technique for the preparation of either (1) acrylate or methacrylate monoesters of polyglycol monoethers, monothioethers or monohalides, which preparation initially involves the reaction of either acrylic acid or esters with polyglycol monoethers, etc. or (2) acrylate and methacrylate diesters of polyglycols by the reaction of acrylic acids or esters with polyglycols; wherein by either preparation the monomeric products may be represented by a structural formula in conformance with Formula I.

The process consists of three steps. These are:

(1) Esterification, involving the reaction of a polyglycol or a polyglycol monoether with acrylic acids or esters using suitable catalysts and polymerization inhibitors to assist in its accomplishment. If desired, although it is not necessary, a diluent solvent vehicle may be employed for the reaction. The chemical reactions that may be utilized for the preparation of the monomeric polyglycol esters involved in the practice are typified by the following equations, wherein the symbol —PG— stands for the polyglycol backbone or constituent of the involved compounds and R is an aliphatic hydrocarbon group:

(a) esterification with acrylic acid:

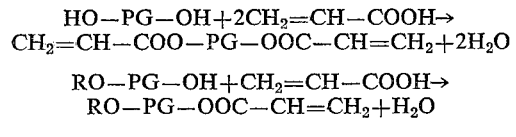

(b) transesterification with an acrylate ester:

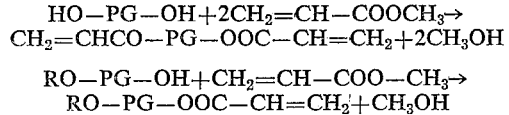

(2) Distillation techniques to remove any diluents or undesired contaminants that may be present in the reaction mass after termination of the esterification reaction, including such materials as water or alcoholic by-products and unreacted acrylic esterification reagents.

(3) Liquid-liquid extraction to isolate and separate the desired monomeric polyglycol ester product from the reaction mass containing the aqueous reaction vehicle after distillation, using for the extraction certain selected solvents of the indicated and hereinafter more fully described varieties. The extracting solvent separates the desired monomeric product from unreacted starting polyglycol materials, water-soluble acid catalysts and certain of the polymerization inhibitors that may be employed, such as copper salts. Polymerization inhibitors that are soluble in the organic solvent, such as phenolic inhibitors, are removed after the solvent extraction by washing the solvent phase with aqueous caustic solution or the like.

In general, as is apparent, the esterification and distillation steps resorted to in the practice of the present invention involve known and heretofore employed techniques. The liquid-liquid extraction step employed in the practice of the present invention, however, provides the advantageous and unexpectedly beneficial results that may be achieved. It is this unique recovery operation that lends striking, demonstrable utility to the present method. As has been indicated and demonstrated, the monomeric polyglycol ester product and the polyglycol starting materials employed for their preparation are both possessed of similar solubilities in water and other polar solvents. Now, according to the usual concept, small changes in and/or on terminal groups of a polymeric material do not materially affect or alter the physical properties of the polymer. Surprising and remarkable as it may seem, however, the liquid-liquid extraction step utilized in the practice of the present invention permits and possibilitates use of a selective extraction operation in the recovery from the aqueous or other polar solvent media of the desired monomeric products that are manufactured. The present process is highly efficient and economical. It affords a truly practical and attractive means for the large scale manufacture of the monomeric polyglycol ester products involved.

The polyglycol starting materials that may be employed for the preparation of the monomeric products include the usually more commonly encountered, "straight" polyglycols that have free, reactive hydroxyl groups, at each of their terminal ends, in order to make polyfunctional monomeric diacrylate products. If desired, monofunctional monomeric products may be prepared by utilizing as a starting material a polyglycol that has only a single reactive hydroxyl end group in its structure, with the opposite terminal group being of the non-reactive variety. Such polyglycols that have but a single reactive hydroxyl group in their constitution may be monoethers (comprised of alkoxy or equivalent aliphatic hydrocarbon groups containing up to about 8 carbon atoms); monothioethers (comprised of alkyl or equivalent aliphatic hydrocarbon sulfides containing up to about 8 carbon atoms); or monohalides (derived from chlorine, bromine or iodine). As is apparent, such monofunctional polyglycol starting materials permit the corresponding monoacrylate esters to be prepared. More generally, any mono derivatives may be utilized in the polyglycol starting materials which are not reactive with the vinyl group in the acrylic reagents and which are not esters. The polyglycol starting materials may have molecular weights between about 100 and 10,000. More advantageously, their molecular weights may be in the range from about 350 to 1200. Frequently, the greatest benefit is derived when polyglycols are employed as starting materials that have molecular weights beneath about 1200.

The acrylic reagents utilized in the esterification of the polyglycols may be comprised of acrylic or methacrylic acids and other alkyl acrylic acids or lower acrylic acid esters of acrylic acid or methacrylic acid up to and including the butyl ester. In general, it is desirable to employ a quantity of the acrylic reagent that is in excess of stoichiometric requirements. It is frequently convenient to use a large excess of the acrylic reagent, such as an excess over stoichiometric requirements that is between about 50 to 400 or so percent. The use of such an excess of the acrylic reagent generally increases the reaction rate in the esterification reaction and facilitates the removal of water or lower alcoholic by-products. The excess quantity of the acrylic reagent also serves advantageously as a diluent in the reaction mass.

As esterification catalysts, there may be employed any high dissociated, strong mineral or organic acid of the variety conventionally used in the art for such purposes. Para-toluene sulfonic acid monohydrate and the like strong organic acids may be used with great benefit. Sulfuric and phosphoric acids are also capable of being employed with satisfaction. While the precise quantity may vary, the amount of acid catalyst that is employed for the esterification is generally in the neighborhood of 5 percent by weight, based on the weight of the starting polyglycol material.

In order to avoid undesired polymerization of the monomer product during the reaction, it is necessary to incorporate a polymerization inhibitor in the reaction mass. Copper salts in cupric form, such as cupric acetate, cupric chloride and cupric sulfate (in either anhydrous or hydrated condition) may be utilized. Organic inhibitors, such as hydroquinone or the various phenol derivatives, may also be employed suitably. Such organic polymerization inhibitors may be of the structural formula:

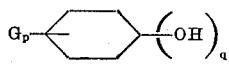

wherein G is chlorine, bromine or an alkyl radical containing from 1 to about 4 carbon atoms; $p$ is an integer from 1 to 4; and $q$ is an integer from 1 to 2. The copper salt inhibitors may generally be employed in quantities between about 1 and 4 percent by weight of copper in the salt, based on the weight of the starting polyglycol. Such quantities of copper salt inhibitors are operative. They are not limiting, however, of the amounts that may be satisfactorily employed. Similarly, organic inhibitors (including hydroquinone) may generally be utilized in an amount between about 0.25 and 2.5 percent by weight of the polyglycol. For organic inhibitors, the lower figure is frequently found to be representative of a minimum quantity.

Although it is not essential to employ a diluent in the reaction mass during the esterification, most non-polar organic solvents may be used for such purpose, if their use should be desired. These include the unsubstituted and halo-substituted aliphatic and aromatic hydrocarbons of from 1 to about 10 carbon atoms, such as benzene, toluene, xylene, cyclohexane, carbon tetrachloride, perchloroethylene, trichloroethylene and the like.

In order to successfully accomplish the liquid-liquid extraction step in the practice of the present invention in an effective and efficient manner, it is necessary to employ a water-immiscible, restricted polarity solvent of particular characteristics for the monomeric polyglycol product. Proper choice of a solvent for the extraction step is of critical importance for the realization of suitable results. This can be readily appreciated when it is taken into account that the monomeric product of Formula I must be extracted by the solvent from an aqueous medium in which it is penultimately obtained after its preparation by esterification and the subsequent removal by distillation of some by-products and unreacted acrylic reagent, in which medium the product is generally mixed with varying quantities of unreacted starting polyglycol of the formula:

$$HO-PG-Y \qquad (II)$$

wherein PG is the polyglycol backbone of the starting material as defined in Formula I, being the same as obtains in the final monomeric product; and Y is either a hydroxyl group in a "straight," bireactive polyglycol or any of the values ascribed to the term "X" in the Formula I. In the instances where the starting polyglycol material is a bireactive compound, monosubstituted products invariably remain in the aqueous medium obtained after the reaction along with the entirely substituted, polyfunctional monomeric products.

As has been indicated, either of the dichloroethanes and amyl alcohol may be used with particular advantage as the product extracting solvent in the practice of the present invention. Other water-immiscible, non-aliphatic, not more than six carbon atom-containing aromatic, hydrocarbon solvents of such characteristics for the monomeric polyglycol ester products of Formula I whose solubility parameters, as hereinafter defined, are between about 9 and about 10.5, with the exception of ethyl or butyl acetates and diethyl ether none of which are efficaciously and beneficially operative in the practice of the present invention.

"Solubility parameter" is a concept that is frequently resorted to and widely employed to describe and characterize the behaviorism of nonelectrolyte solution systems. The concept is expounded and elucidated with considerable detail in a book by Hildebrand and Scott that is entitled "Solubility of Nonelectrolytes," ACS Monograph Series No. 17, Reinhold Publishing Company, 3rd ed., 1957. One definition of the parameter may be found at page 424 of the reference, wherein it is brought forth that the thermodynamic properties of solutions depend upon the square of the difference between the values of the separate quantities $d$ for each of the two components that comprise the solution. Such $d$ values, which have been termed "solubility parameters," are the factors that enable at least semi-quantitative prediction and interpretation of the solubilities of various liquids. In chapter VII of the referred-to volume, solubility parameters are identified with the square roots of the internal pressure or cohesive energy densities of the pure substances involved. A mathematical expression for the solubility parameter is:

$$d=(-E/V')^{1/2}$$

wherein $-E$ is the energy of vaporization of the liquid to the gas at zero pressure (i.e., under a condition wherein the molecules are separated from one another by infinite, or effectively infinite, distances) and $V'$ is the molal volume of the particular liquid involved.

The foregoing definition is also included in chapter XII of Hildebrand and Scott's work along with a thorough discussion of various calculation methods, effects of temperature on solubility parameters, etc. The thermodynamic derivation of $d$ is provided by Hildebrand and Scott at page 129 and the preceding pages of their treatise. In appendix I of the book there are set forth selected solubility parameter ($d$) values at 25° C. for many solvents.

Use of a suitable extracting solvent in the practice of the present invention having a solubility parameter within the general prescribed limits ordinarily assures the efficiency, within varying degrees, of the operation. This can be measured and correlated to the solubility parameter of the solvent employed by comparison with the percentage efficiency of such solvent as determined with reference to the efficacy of 1,2-dichloroethane as a standard solvent for the extraction. Thus, percentage efficiency is taken as the change in volume of a solvent phase in contact with an aqueous phase containing the monomeric polyglycol acrylate ester product, measured relative to dichloroethane as a standard. To determine percentage efficiency as a practical matter, equal volumes of an aqueous solution of the monomer (containing about 50 percent by weight of active monomer) and the organic extracting solvent are mixed together. The change in volume of the organic layer that is experienced is taken as the measure of the amount of monomer assimilated by the extracting solvent during the operation. Percentage efficiency, based on dichloroethane as the standard solvent, may then be calculated according to the following equation:

$$\text{Percent efficiency} = \frac{\Delta \text{ volume (solvent)} \times 100}{\Delta \text{ volume (dichloroethane)}}$$

In the following tabulation, there is set forth the relationship, for purposes of utilization in the practice of the present invention, between "percentage efficiency" and "solubility parameter" of several various solvents.

TABLE 1

*Relations between percentage efficiency and solubility parameter for various solvents used to extract monomeric polyglycol acrylate esters from aqueous media*

| Solvent | Percentage Efficiency | Solubility Parameter (d) |
|---|---|---|
| Trichloroethane | 127 | 9.90 |
| Amyl alcohol (iso) | 100 | [2] 10.6 |
| 1,2-Ethylene dichloride | [1] 100 | 9.89 |
| Monochloro benzene | 80 | 9.5 |
| Benzene | 80 | 9.18 |
| Perchloroethylene | 67 | 9.32 |
| Carbon tetrachloride | 11 | 8.61 |
| Ethyl acetate | 0 | 9.05 |
| Diethyl ether | 0 | 7.54 |
| Petroleum ether | 0 | [3] |
| n-octane | 0 | 7.57 |
| n-heptane | 0 | 7.05 |

[1] Standard basis.
[2] Approximate.
[3] Contains $C_7$ and $C_8$ compounds.

The corollation that is evident in the foregoing table can also be established and demonstrated by graphical portrayal.

In general, compounds whose solubility parameters, or *d*-values, are above about 11 are water-miscible. For purposes of comparison with the values in the foregoing isopropyl alcohol has a solubility parameter of 12.89. The solubility parameter of water itself is 23.47. Tertiary butyl alcohol and acetone, which do not provide operable results in the practice of the invention, are water-soluble materials that are more or less exceptions to the general rule above stated. Thus, the solubility parameter of tertiary butyl alcohol is 10.3, while that of acetone is 9.81. It should be borne in mind, incidentally, as is cautioned at page 387 of the referred-to book by Hildebrand and Scott, that: "solubility parameters . . . (of) polar solvents such as esters . . . are not very reliable."

In the esterification step that is employed to prepare the monomer products in the practice of the present invention, it is desirable to heat the reagents together with agitation for a period that may be as long as 48 or more hours, although suitable results are generally obtained within 6 to 12 hours periods of time. Ordinarily, about 70 to 75 percent conversion of the starting polyglycol material is experienced when only a 6 to 12 hour reaction period is employed, although almost complete conversions can usually be achieved when relatively longer periods of time or greater quantities of catalyst are allowed for the esterification.

A temperature of from 70 to 150° C., or so, may advantageously be employed for the reaction, depending somewhat on the particular reagents and diluents used and also upon whether or not sub- or superatmospheric pressures are employed. During the esterification procedure, it is beneficial to continuously remove from the reaction mass, by fractionation or other means, the small quantities of water, methanol or other low boiling and relatively fugacious transesterification by-products that are obtained. At the termination of the esterification reaction, the acid catalyst is preferably neutralized with a suitable basic material. It is then preferable to rid the reaction mass of any small amounts of insoluble polymeric by-products that may be formed. This, as has been demonstrated, may be readily accomplished by filtration.

Conventional vacuum or atmospheric distillation or steam distillation techniques may be employed separately or in combination, as may be required for greatest convenience or expedience, in order to remove alcoholic by-products, unreacted acrylic reagents and diluents from the reaction mass after completion of the esterification. During the distillation operation, temperatures should not exceed about 150° C. In this way, hydrolysis of the monomeric product ester or its possible discoloration or undesired polymerization may be avoided. During or after the distillation procedure, the non-volatile monomeric polyglycol ester product is dissolved in water in order to provide the aqueous medium from which it is extracted and separated in the practice of the present invention.

Extraction of the aqueous solution of the monomeric polyglycol ester product that is provided after the esterification and distillation steps can be carried out to any desired degree of completeness with the extracting solvent employed. Single or multiple stage, or continuous (advantageously countercurrent) extraction methods, in the generally known manner, may be employed according to greatest suitability or desirability. As has been indicated, the extraction is very efficient. Quite commonly, for example, one volume of the extractant solvent serves to remove at least about 75 percent of the monomeric ester product from the water phase in a single equilibrium extraction. In order to obtain best results in the practice of the present invention, it is desirable for the monomeric product to be contained in a concentration in the aqueous medium from which it is extracted that is between about 1 and 90 percent by weight, preferably between about 30 and 80 percent by weight. Although any ratio of the aqueous monomer-containing medium to the extracting solvent may be utilized, it is generally quite advantageous and may even be preferable, for sake of convenience and to best meet commercial demands, to employ between about ⅕ and 10 volumes of the extracting solvent, preferably between about ⅓ and 3 volumes, for each volume of the monomer-containing aqueous medium that is being extracted. As has been indicated, it is frequently of greatest advantage to employ about equal volumes of the aqueous monomer-containing medium and the extracting solvent.

After the extraction, any hydroquinone or other similar organic polymerization inhibitor can be easily removed by treatment of the monomer-containing solvent phase with an aqueous base. The monomeric polyglycol ester product is commonly and may be advantageously employed for further polymerization as well as for other reactions while it is dissolved in the extraction solvent in which it is finally obtained. If desired or necessary, however, it may be separated from the extractant solvent by distillation in order to transform it to a completely purified condition.

What is claimed is:

1. In the method of preparing a monomeric polyglycol ester product of the formula:

$$X(C_2H_4O)_y(C_3H_6O)_z(OC-ZC=CH_2) \qquad (I)$$

wherein X is selected from the group consisting of —OR radicals in which R is a monovalent aliphatic hydrocarbon unit containing from 1 to about 8 carbon atoms; —SR radicals in which R is a monovalent aliphatic hydrocarbon unit containing from 1 to about 8 carbon atoms, acrylate radicals, methacrylate radicals and halogens of atomic number 17 to 35; Z is selected from the group consisting of hydrogen and methyl radicals; y is a number having an average value from about 5 to 200; and z is a number having an average value from 0 to about 10; in which preparation there is esterified with an acrylic reagent a starting polyglycol material of the formula:

$$H(OC_2H_4)_y(OC_3H_6)_zY \qquad (II)$$

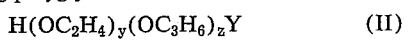

wherein the meaning of the terms y and z are as in the foregoing, and Y is selected from the group consisting of hydroxyl radicals and any of the radicals defined above for the term X; said acrylic reagent being adapted to transform by esterification therewith the starting polyglycol of Formula II to the product of Formula I using strong acid catalysts and polymerization inhibitors in the reaction mass during said esterification; and in which preparation by-products of the reaction and unreacted acrylic reagents are removed from the reaction mass by distillation after the termination of said esterification and said monomeric product of Formula I is obtained in an aqueous medium after said esterification and distillation steps; the improvement in the recovery of said monomeric product of Formula I from said aqueous medium during the practice of said method of preparation, which improvement comprises an extraction step that consists of mixing a quantity of said monomer-containing organic aqueous medium with another quantity of a water-immiscible, solvent exclusive of ethyl acetate, butyl acetate and diethyl ether, which solvent contains not more than 6 carbon atoms in its total structure, said structure characterized in having substituents thereon selected from the group consisting of hydrogen, halogen, hydroxyl and mixtures thereof, said solvent having a solubility parameter at about 25° C. between about 9 and about 10.5, said solubility parameter having a value $d$ according to the equation:

$$d = (-E/V')^{1/2}$$

wherein $-E$ is the energy of vaporization of the liquid to the gas at zero pressure and $V'$ is the molal volume of the liquid; permitting said aqueous medium to separate as a phase from said monomer-enriched solvent phase; and withdrawing the monomer-containing solvent phase from the aqueous phase after said phases have separated.

2. The improved recovery step of claim 1, wherein between about 1/8 and 10 volumes of said extracting solvent are mixed with each volume of said monomer-containing aqueous medium from which said monomer product of Formula I is to be recovered.

3. In the improved recovery step of claim 1, wherein said extracting solvent is selected from the group consisting of dichloroethanes, trichloroethane, an amylalcohol, monochlorobenzene, benzene, perchloroethylene, and their mixtures.

4. In the improved recovery step of claim 1, wherein said extracting solvent is 1,2-dichloroethane.

5. In the improved recovery step of claim 1, wherein said extracting solvent is 1,1-dichloroethane.

6. In the improved recovery step of claim 1, wherein said extracting solvent is trichloroethane.

7. In the improved recovery step of claim 1, wherein said extracting solvent is isoamylalcohol.

8. In the improved recovery step of claim 1, wherein said extraction is conducted in a single stage.

9. In the improved recovery step of claim 1, wherein said extraction is conducted in a plurality of stages in which said monomer-containing aqueous medium is successively contacted and mixed with quantities of fresh, monomer-lean extracting solvent effective upon said aqueous medium to extract monomer therefrom in each of said stages.

10. In the improved recovery step of claim 1, wherein said extraction is conducted in the manner of a continuous process in which a flowing stream of said monomer-containing aqueous medium is continuously contacted and mixed with a flowing stream of said solvent to continuously extract monomer therefrom.

11. The improvement in the art of claim 1, wherein non-polar organic solvents are used as diluents for the reaction mass during said esterification in addition to and in combination with said strong acid catalysts and said polymerization inhibitors in said reaction mass.

References Cited in the file of this patent

UNITED STATES PATENTS

| | | |
|---|---|---|
| 2,388,844 | Hasche | Nov. 13, 1945 |
| 2,458,888 | Rehberg | Jan. 11, 1949 |
| 2,465,991 | Anderson | Apr. 5, 1949 |
| 2,815,369 | Holt | Dec. 3, 1957 |

FOREIGN PATENTS

| | | |
|---|---|---|
| 644,828 | Great Britain | Oct. 18, 1950 |

OTHER REFERENCES

Hildebrand et al.: "Solubility of Non-Electrolytes," 3rd ed., 1950, pp. 435–439.

Fuson: "Advanced Organic Chemistry," 1950, page 200.

Perry: "Chemical Engineers Handbook," McGraw-Hill (1950), pp. 714–718.